United States Patent [19]
Munson, Jr. et al.

[11] Patent Number: 5,971,691
[45] Date of Patent: Oct. 26, 1999

[54] FORMS TRANSFER SYSTEM AND METHOD

[75] Inventors: Thomas Patrick Munson, Jr.; Wilbur Drew, both of Dover; Daniel James Nicols, Barrington; Ross A. Freeman, Somersworth, all of N.H.

[73] Assignee: Moore U.S.A., Inc., Grand Island, N.Y.

[21] Appl. No.: 09/026,174

[22] Filed: Feb. 19, 1998

[51] Int. Cl.⁶ ............................................ B65G 67/00
[52] U.S. Cl. .......................... 414/398; 414/490; 414/491; 414/505; 414/802; 414/809; 414/812
[58] Field of Search .................... 414/354, 362, 414/489–491, 398, 505, 802, 809, 812; 280/47.16, 47.17, 47.2, 47.27, 47.29

[56] References Cited

U.S. PATENT DOCUMENTS

| | | | |
|---|---|---|---|
| 1,719,197 | 7/1929 | Schlothan | 414/789.2 X |
| 2,741,383 | 4/1956 | Leckert | 414/491 X |
| 3,036,722 | 5/1962 | Sharaway | 414/528 |
| 3,406,840 | 10/1968 | Soteropulos | 414/789.2 |
| 4,345,865 | 8/1982 | Jager | 414/789.2 X |
| 4,493,601 | 1/1985 | Hill et al. | 414/491 |
| 4,995,773 | 2/1991 | Lamoureux et al. | 414/489 |
| 5,013,207 | 5/1991 | Baker et al. | 414/489 |
| 5,042,240 | 8/1991 | Rocca et al. | 414/505 X |
| 5,190,432 | 3/1993 | Gerow | 414/489 |
| 5,273,516 | 12/1993 | Crowley | 414/789.2 X |
| 5,282,501 | 2/1994 | Miller, III | 414/505 X |
| 5,399,143 | 3/1995 | Crowley | 414/789.2 X |
| 5,468,010 | 11/1995 | Johnson | 414/490 X |
| 5,630,780 | 5/1997 | Crowley | 414/789.2 X |

Primary Examiner—David A. Bucci
Attorney, Agent, or Firm—Nixon & Vanderhye P.C.

[57] ABSTRACT

Business forms are stacked using a cart having first and second portions pivotally movable with respect to each other from a substantially L-shaped configuration to a substantially in-line configuration with each portion having a conveyor associated with it, and a docking station. The cart with the first and second portions in the substantially L-shaped configuration is moved into operative association with the docking station. The cart is lifted and rotated in the docking station so that the second portion is substantially horizontal, and the first portion of the cart is pivoted with respect to the second portion so that the first portion is in the substantially in-line configuration with respect to the second portion. The conveyors are operated so that business forms are moved onto the first portion, and then onto the second portion, with the second conveyor operating at a speed of at least fifty percent greater than the first conveyor (e. g. about ten times as fast). An indicator automatically indicates when the frame is substantially full of forms and then the forms are moved off the first portion and operation of the conveyors stopped, and then the first portion is pivoted back to the substantially L-shaped configuration, the cart is lowered and rotated so that the second portion is substantially vertical, and the cart is manually rolled out of contact with the docking station.

24 Claims, 7 Drawing Sheets

FORMS TRANSFER SYSTEM AND METHOD

BACKGROUND AND SUMMARY OF THE INVENTION

There are many circumstances when it is highly desirable to be able to quickly, efficiently, inexpensively, and with relatively little and inexpensive equipment, stack and transport business forms. The invention fulfills all of these criteria at the same time, using some simple components, and simple operating techniques, by using a manual hand-truck, which is modified so that it can be used both as a conventional hand-truck and also as a conveying apparatus for stacking the forms, the number of components necessary to effectively and simply stack forms is minimized, and by using a docking station that is readily compatible with many conventional business forms handling devices (such as continuous spiral folders) a very practical arrangement may be provided.

According to one aspect of the present invention a cart assembly is provided comprising the following components: A frame having a first portion and a second portion pivotally connected to the first portion. A first conveyor mounted to the first portion, and a second conveyor mounted to the second portion. At least one power source which powers the conveyors. And, rolling supports attached to the frame which allow rolling movement of the frame.

The first and second conveyors are typically powered separately so that the second conveyor moves at least 50% slower than the first conveyor. A single motor with different gearing or pulley sizes can effect this differential powering, or two different motors may be used. First and second conveyors typically comprise conveyor belts, which may be interleaved from one conveyor to the other, although other conventional conveyor structures may be provided.

The first and second portions are pivotally connected so that they are movable from a first position in which the first and second portions are substantially perpendicular to each other (having a substantially L-shaped configuration), to a second position in which the first and second portion conveyors are substantially in-line with each other. First and second levers may each be pivotally connected at first and second ends thereof to the first and second portions respectively, with latches and slots for guiding the movement of one of the pivot pins when the portions are moved out of the substantially L-shaped configuration.

The rolling supports may comprise a first set of rolling supports (such as typical wheels connected to a common axle) on the second portion with a second set of rolling supports (such as casters) connected to the first portion. One or two pairs of shaft stubs may extend outwardly from the second frame portion substantially in-line with each other, for cooperation with a docking station. The second frame portion typically has first and second ends, and a handle is mounted adjacent the first end and the first portion is pivotally connected to the second portion adjacent the second end of the second portion.

According to another aspect of the present invention a material transport assembly is provided comprising the following components: A cart assembly having: a frame having a first portion and a second portion pivotally connected to the first portion, the first and second portions being movable from a first position in which the first and second portions are substantially perpendicular to each other, having a substantially L-shaped configuration, to a second position in which the first and second portion conveyors are substantially in-line with each other; a first conveyor mounted to the first portion, and a second conveyor mounted to the second portion; and rolling supports attached to the frame which allow rolling movement of the frame. And, a docking station dimensioned to receive the cart therein and for moving the cart from a position in which the second portion is generally upright to a position in which the cart second portion is substantially horizontal.

The cart assembly typically is as described above. The docking station preferably comprises means for automatically pivoting the cart frame about a substantially horizontal axis and means for moving the cart frame vertically. The automatic pivoting means may comprise any suitable conventional structure for that purpose, and the means for moving the cart frame vertically may comprise various hydraulic or pneumatic cylinders, motors with linearly moving elements powered thereby, or any other suitable conventional structure.

The material transport assembly may further comprise a stacking table having a horizontal surface, the means for moving the cart frame vertically and pivotally so that the stacking table horizontal surface is substantially horizontally aligned with the second conveyor portion. Also at least one power source is provided which powers the conveyors, mounted on the cart frame. The shaft stubs from the cart second frame portion may be engaged by the docking station for effecting vertical movement as well as automatic pivoting of the cart frame about a horizontal axis.

The invention also relates to a method of stacking business forms using a cart assembly having first and second portions pivotally movable with respect to each other from a substantially L-shaped configuration to a substantially in-line configuration, each portion having a conveyor associated with it, and a docking station. The method comprises the following steps: (a) Moving the cart assembly with the first and second portions in the substantially L-shaped configuration into operative association with the docking station. (b) Lifting and rotating the cart assembly in the docking station so that the second portion thereof is substantially horizontal. (c) Pivoting the first portion of the cart assembly with respect to the second portion so that the first portion is in the substantially in-line configuration with respect to the second portion. And, (d) operating the conveyors so that business forms are moved onto the first portion, and then onto the second portion from the first portion.

Step (d) is practiced so as to move the business forms with the first conveyor at a speed of at least 50% greater than the second conveyor, typically a speed of about ten times greater, thereby compacting the forms by a set ratio speed. There is also typically the further step of placing a backstop on the second portion against which forms are pushed by the first and second conveyors, primarily by the second conveyor. There are also typically the further steps of: (e) automatically indicating when the frame is substantially full of forms and then (f) moving the forms off the first portion and stopping operation of the conveyors, (g) pivoting the first portion back to the substantially L-shaped configuration, and (h) lowering and rotating the cart assembly in the docking station so that the second portion thereof is substantially vertical; and (i) manually rolling the cart assembly with forms thereon away from the docking station.

It is the primary object of the present invention to provide for the simple yet effective transport and stacking of business forms using a simple cart assembly, and/or docking station. This and other objects of the invention will become clear from an inspection of the detailed description of the invention and from the appended claims.

DETAILED DESCRIPTION OF THE DRAWINGS

Figure 1:
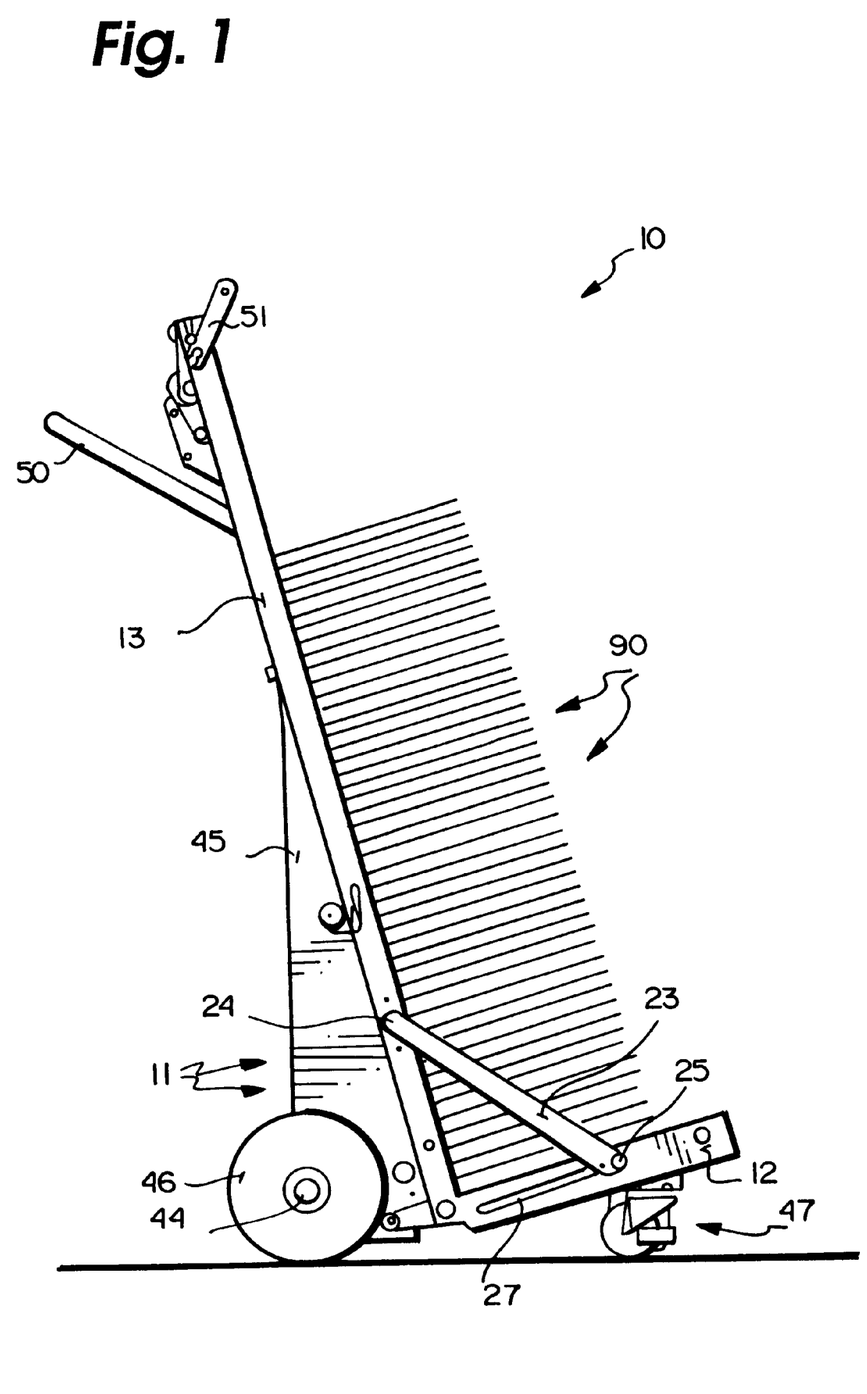
FIG. 1 is a side schematic view of a cart according to the invention shown holding a stack of business forms.
Figure 2:
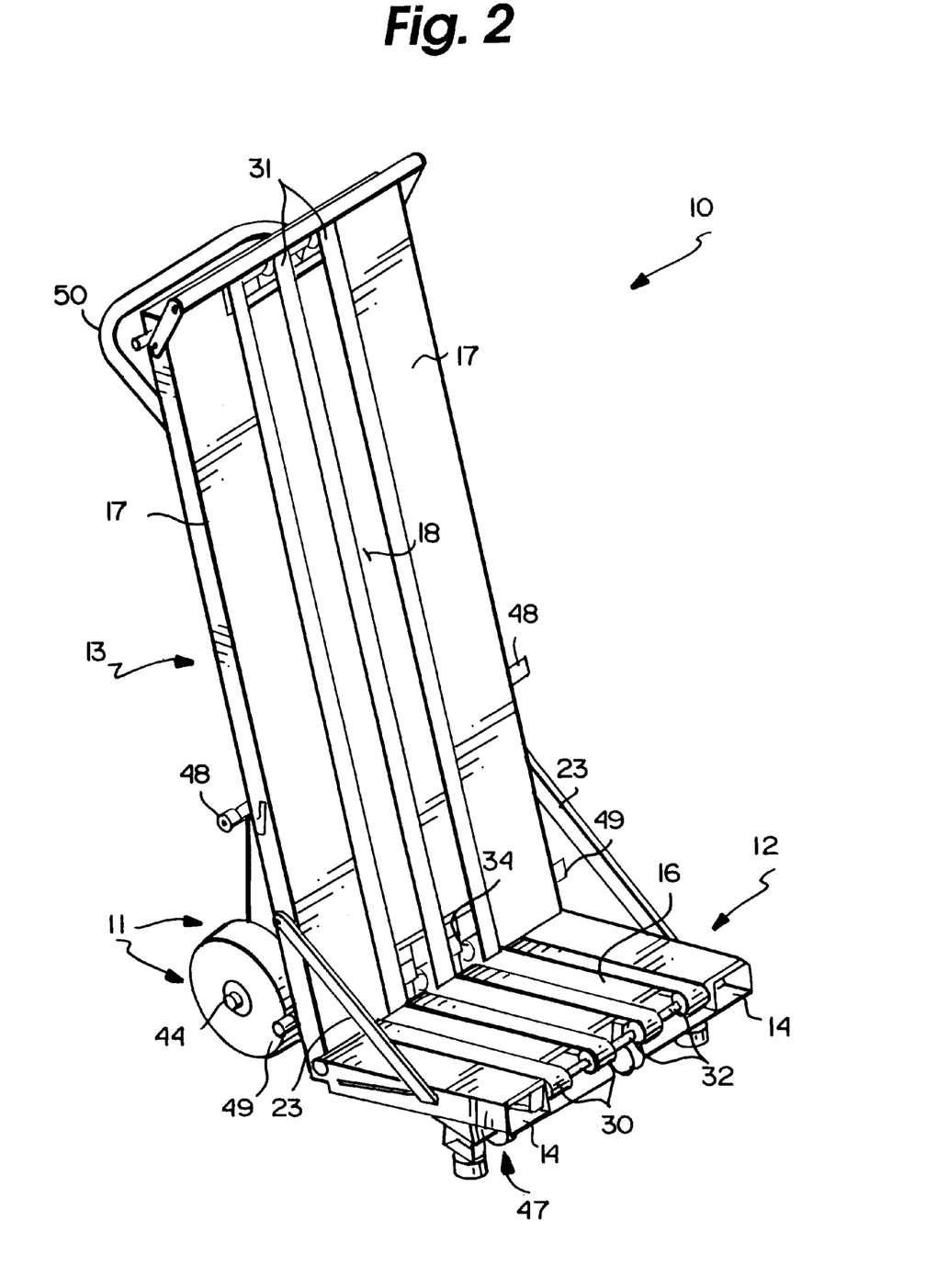
FIG. 2 is a top perspective view of the cart of FIG. 1 without forms.

An exemplary cart assembly according to the present invention is shown generally by reference numeral 10 in FIGS. 1–6. The cart assembly 10 includes a frame 11, typically of metal, having a first portion shown generally by reference numeral 12, and a second portion shown generally by reference numeral 13. As perhaps best seen in FIGS. 2 and 6, the frame portion 11 may be formed by a plurality of channels 14 interconnected together by any suitable conventional structures, such as mechanical fasteners, welding, bridging plates, or the like. The bottom plate 15 (see FIG. 6) is desirably provided, as well as a top plate 16 having less of an extent than the 15, and positioned as seen in FIG. 2. The plates 15, 16 may be welded, screwed, or otherwise attached to the channels 14.

Figure 6:
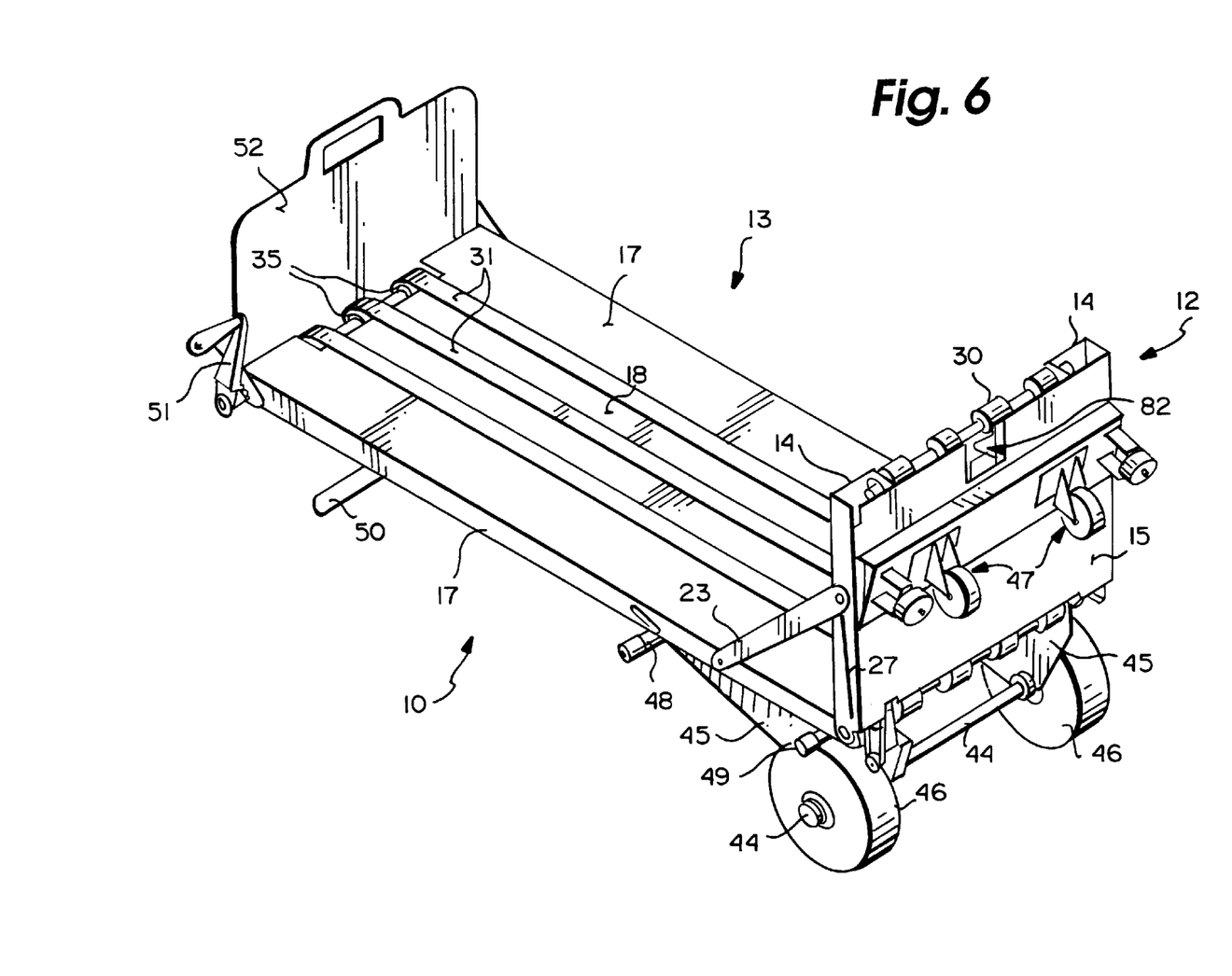
FIG. 6 is a top perspective view of the cart of FIGS. 1–5 alone with a backstop for forms in place, and with the tailgate of the cart moved into an L-shaped position with the rest of the cart for supporting forms thereon when the cart is substantially vertical.

The portion 13 of cart assembly 10 may also be constructed in a wide variety of ways, such as the exemplary manner illustrated in FIGS. 2 and 6, having a pair of side channels 17 interconnected by a bottom plate 18, which is welded, screwed, or otherwise connected to the channels 17, or the components may be formed as an integral element.

Figure 4:
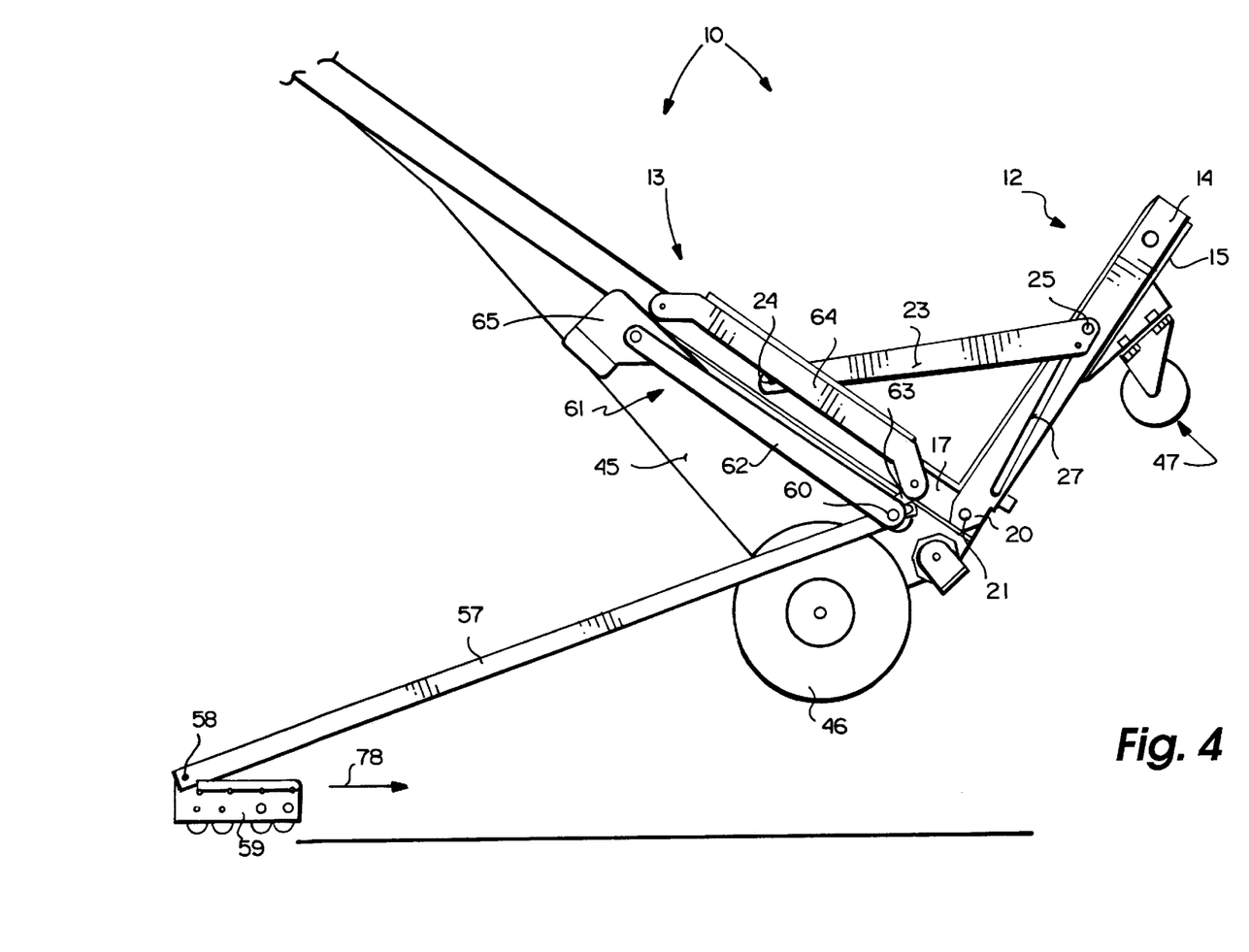
FIG. 4 is a side schematic detail view of the cart of FIGS. 2 and 3 as it is being rotated about a horizontal axis to a forms receiving position; the docking system—except for levers thereof which are directly connected to the cart—not seen in FIG. 4 for clarity of illustration.
Figure 5:
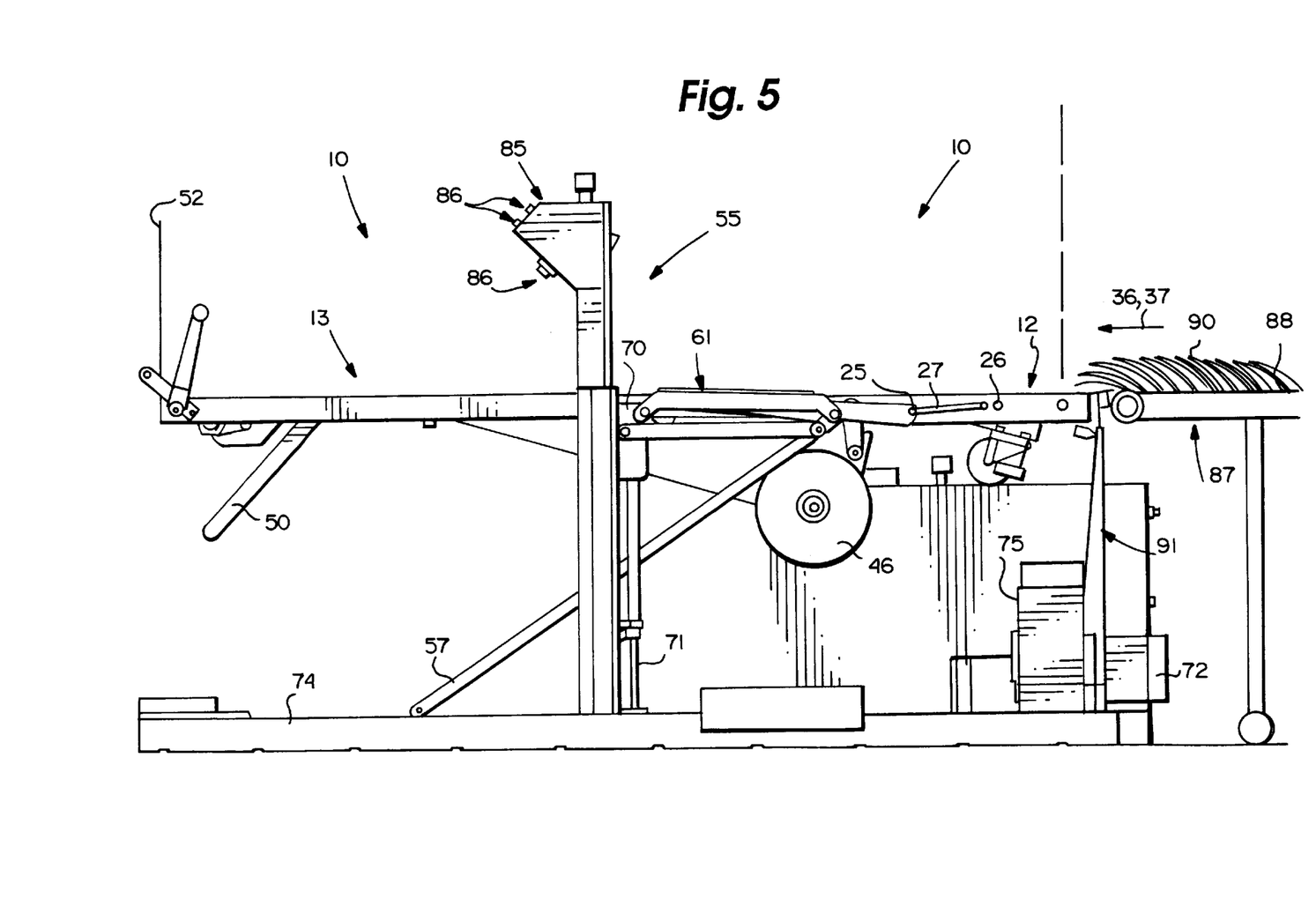
FIG. 5 is a schematic side view of the system of FIG. 3 showing the cart moved into its operative position for the receipt of business forms thereof from another piece of forms handling equipment.

The sections 12, 13 are pivotally connected to each other so that the section 12 can move with respect to the section 13 between the substantially L-shaped position illustrated in FIGS. 2 and 6 to the substantially in-line position illustrated in FIG. 5. While the pivot connection may be provided in any suitable conventional manner, such as perhaps most clearly illustrated in FIGS. 4 and 6 in the preferred embodiment illustrated a flange 20 may extend outwardly from each of the channels 14 into an overlapping relationship with the proximate end of the adjacent channel 17, and a pivot pin 21 holds the channels 14, 17 together. To lock the portion 12 in the L-shaped position of FIGS. 2, 4, and 6, the locking levers 23 are provided. Each lever 23 is substantially immovably but pivotally connected by a pivot pin 24 at one end thereof to the section 13, and slidably pivotally connected at the other end thereof by a pivot pin 25. The pin 25 may be latched in the opening 26 at the end of slot 27, which opening 26 latches the lever in the position illustrated in FIG. 6.

The cart assembly 10 also comprises a first conveyor, such as in the form of conveyor belts 30 (see FIGS. 2, 3, 6, and 8) mounted to the first portion 12, and a second conveyor—such as conveyor belts 31—mounted to the second section 13. Where conveyor belts are provided as the first and second conveyors 30, 31, they are mounted for movement about two or more rollers, at least one of which is powered. For example the conveyor belts 30 rotate about a first roller 32 at the distal end of the section 12 from the section 13, and a second roller 33 (see FIG. 8) proximate the second portion 13. Similarly the belts 31 are rotatable about rollers 34 proximate the portion 12, and rollers 35 (see FIG. 8) distal from the portion 12. It is preferred that the conveyors 30, 31 be conveyor belts that are spaced from each and aligned with the direction of movement thereof (such as indicated by the directional arrows 36 and 37 in FIG. 8), although in some circumstances solid conveyor belts could be used, or other conventional conveying elements. Note that the conveyor belts 30, 31 may be interleaved, especially in the position illustrated in FIGS. 2 and 3.

Figure 8:
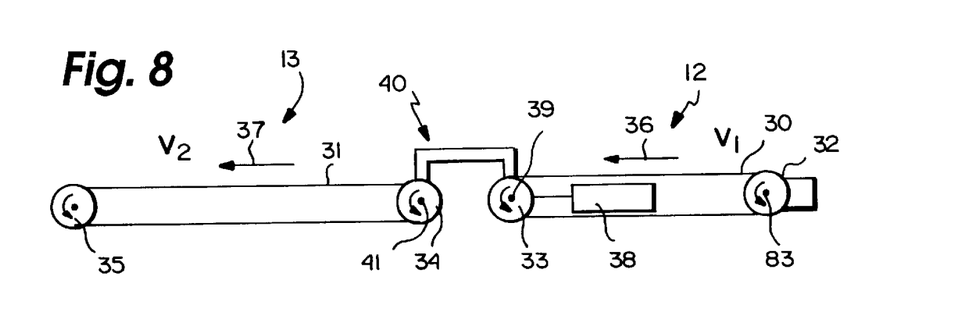
FIG. 8 is a side schematic detail view of an exemplary drive system for the cart belts of FIGS. 1–6.

At least one power source is provided which powers the conveyors 30, 31. While a wide variety of different power sources may be provided, in the embodiment schematically illustrated in FIG. 8, a small (e.g. 12 volt) electric motor 38 is mounted in association with one of the sections 12, 13 and drives the rollers for powering the conveyor belts 30, 31. While two different motors could be utilized, for example a motor like the motor 38 but connected to the drive shaft for the rollers 35, for simplicity sake one motor 38 is illustrated in FIG. 8 and shown schematically connected to the shaft 39 for mounting the roller 33 for rotation, as indicated by the arrow in FIG. 8. The shaft 39 is then—in this embodiment—connected by any suitable conventional speed reduction mechanism—shown only schematically at 40 in FIG. 8—to drive the shaft mounting the roller 34 at a reduced speed. For example the mechanism 40 may be various pulley or belt arrangements, gear reduction mechanisms, chain and sprocket components, or the like. Preferably the mechanism 40 effects a reduction in the speed (or if a separate motor is used for the portion 13 it operates at a reduced speed) so that the conveying surface of the conveyor belt 30 moves at a speed at least 50% greater than the speed of the conveyor 31, and preferably the speed of the conveying surface of the conveyor 30 (in the direction of arrow 36) is about ten times greater than the speed of the conveying surface of the conveyor 31 in the direction 37. This facilitates proper stacking of the forms when the cart assembly 10 is in the stacking position illustrated in FIGS. 5 and 8.

The motor 38 may be mounted to the channels 14 by any suitable supports, or may be otherwise mounted in any conventional manner, and it may be operatively connected to the shaft 39 by gearing, belts and pulleys, chains and sprockets, or other conventional mechanisms so as to effect rotation thereof. The motor may be plugged into any suitable power source (e.g. on a docking station hereafter described), either manually or automatically. Alternatively the power source could be mounted on the docking station (hereinafter described) and connected up to the motor (or motors) 38 when properly moved into the docking and conveying position, such as illustrated in FIGS. 5 and 8.

The cart assembly 10 further comprises rolling supports attached to the frame 11 which allow rolling movement of the frame. For example rollers, wheels, drums, tracks, casters, or like structures could be utilized. In the preferred embodiment illustrated in the drawings, and perhaps best seen in FIGS. 1, 2, 4, and 6, the rolling supports comprise an axle 44 mounted for rotation typically about a generally horizontal axis (e.g. by conventional bearings) in one or more support plates 45 connected to the frame 11 and extending outwardly therefrom on the opposite face from the conveyor belts 31. The plate or plates 45 may be welded, screwed into, or otherwise attached to the frame 11. At opposite ends of the axle 44 are conventional wheels 46, seen most clearly in FIG. 6 (and in that FIGURE two plates 45 are provided). The wheels 46 are typically conventional hand truck wheels.

The rolling supports also preferably comprise the casters 47, which are fixed to the bottom plate 15 of the cart first portion 12. The casters 47 may be of any conventional type, either which allow rotation about a vertical axis as well as a horizontal axis, or just allow rotation about a horizontal axis substantially parallel to the axle 44.

The cart assembly 10 may also comprise one or more pairs of shaft stubs, such as the shaft stubs 48, 49 illustrated in FIGS. 2 and 6. The stubs 48, 49 of each pair extend outwardly from the frame 11 substantially perpendicular to the direction of movement of the conveyor belts 30, 31. The shaft stubs 48, 49, respectively, with each pair are substantially in-line with each other, and may be used for facilitating receipt and pivotal movement of the cart assembly 10 by a docking station (to be hereinafter described).

The second frame portion 13 also preferably comprises a handle 50 mounted/connected to the frame second portion 13 distal from the first portion 12, the frame portion 13 pivotally connected to the portion 12 at the end opposite the handle 50. Also a hand crank can be provided, as illustrated schematically at 51 in FIG. 6 for manually turning the belts 30, 31 to quickly move forms from frame portion 12 onto frame portion 13, so that frame portion 12 may be raised into a position substantially perpendicular to frame portion 13. The hand crank 51 is not necessary, however, only a possible option.

Figure 3:
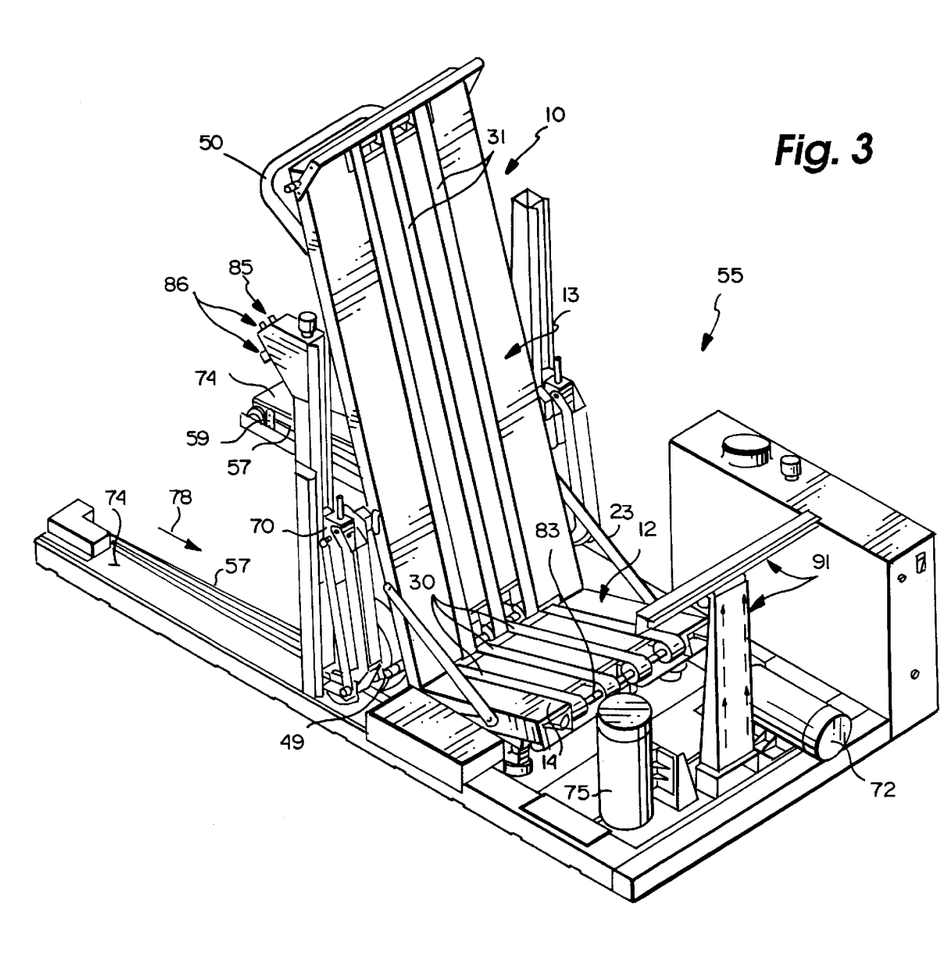
FIG. 3 is a top perspective view of the cart of FIG. 2 in initial operative association with a docking system according to the present invention.
Figure 7:
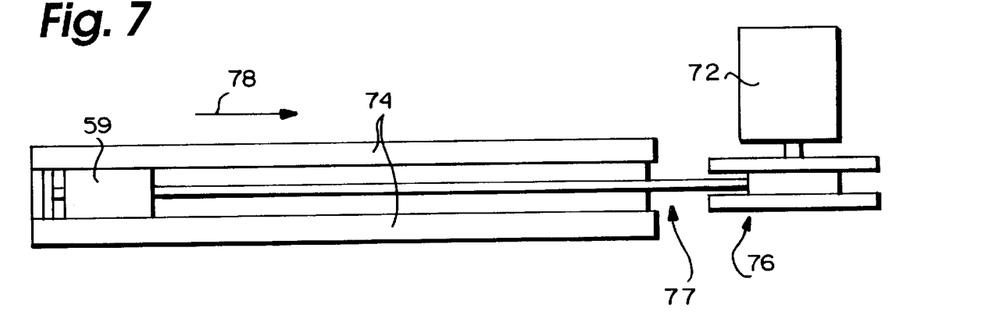
FIG. 7 is a side schematic detail view of an exemplary drive system for assisting in rotating the cart between the positions of FIGS. 3 and 5.

The invention also relates to a material transport assembly which includes the cart assembly 10 and a docking station, shown generally and schematically by reference numeral 55 in FIGS. 3 and 5, with portions thereof also visible in FIGS. 4 and 7. The docking station 55 is dimensioned to receive the cart assembly 10 therein and for moving the cart assembly 10 from a position (see FIG. 3) in which the cart second portion 13 is generally upright, through an intermediate, temporary position (FIG. 4), and into a form conveyance position (FIG. 5) in which the cart second portion 13 is substantially horizontal. Typically the cart portion 12 is not pivoted to the in-line position (that illustrated in FIG. 5) with respect to the second portion 13 until the second portion 13 is substantially horizontal. That is, the L-shaped configuration between the portions 12, 13 (such as in FIGS. 2 and 4) is maintained until the position of the portion 13 illustrated in FIG. 5 is reached.

The docking station 55 may comprise means for automatically pivoting the cart frame 11 about a substantially horizontal axis. Such means may, in the merely exemplary embodiment illustrated in the drawings, take the form of a pair of levers 57 (see FIGS. 3 through 5 in particular) pivoted by pivot pin 58 at one end thereof to a reciprocating driven element 59, and pivotally connected for example by a pivot pin 60 (see FIG. 4) thereof at the opposite end to a lever arrangement 61 which mounts on the shaft stubs 48, 49. The lever arrangement 61, which may include the individual components 62, 63, 64, and 65, as illustrated in FIG. 4, may be connected to the shaft stubs 48, 49 in any suitable manner. Note that the opposite side of the cart assembly 10 from that illustrated in FIG. 4 contains a similar mechanism 61.

Figure 9:
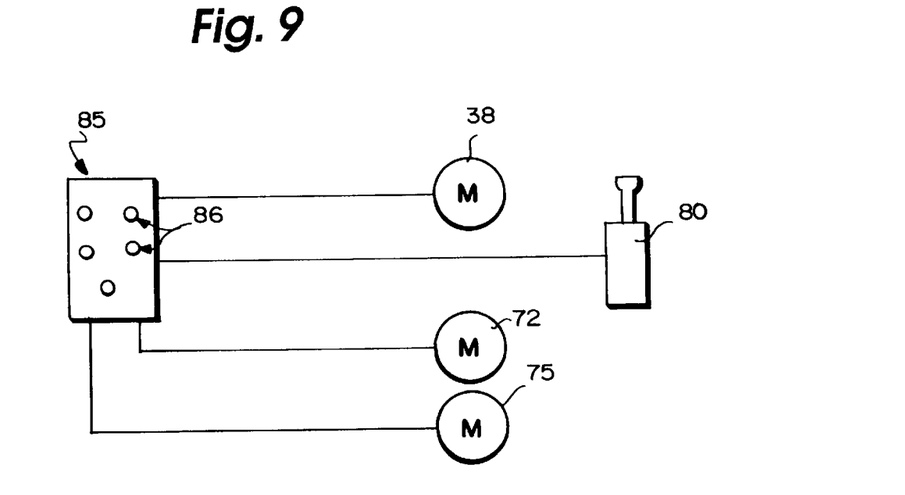
FIG. 9 is an exemplary control schematic showing the interconnection of the powered components of the system of FIG. 2.

In addition to components of the structure 61 being connected to the cart assembly 10—as through the shaft stubs 48, 49—they are also preferably connected to a means for moving the cart vertically, such as the traveling nut 70 (see FIGS. 3 and 5) which is moved vertically by a pneumatic cylinder, hydraulic cylinder, or by rotating a shaft 71 (see FIG. 5) with an electric motor, such as shown schematically at 72 in FIGS. 3, 5, and 9, and which is connected by any suitable gearing mechanisms to the shaft 71 (one shaft 71 being provided on either side of the docking station 55).

The reciprocating elements 59 move within tracks 74 (see FIGS. 3, 5, and 7) and are reciprocated in the tracks 74 by any suitable power source, such as a motor shown schematically at 72 in FIGS. 5, 7, and 9. The reciprocating element 59 can be powered by any suitable connection to the motor 72, such as through a pulley and cable arrangement, a pulley shown schematically at 76 in FIG. 7 and a cable at 77, with a similar arrangement being provided for the cable associated with the second element 59.

In operation of the automatically pivoting and vertically moving means, when the motor 72 is operated the reciprocating elements 59 are moved from the position illustrated in FIGS. 3 and 7 in the direction of arrow 78 (see FIGS. 3, 4, and 7) which causes the lever 57 to pivot the cart assembly 10 through the position illustrated in FIG. 4 to the position illustrated in FIG. 5, while the structures 65 and 70 define a pivot point for the cart, substantially at the shaft stub 48. The motor 75, or a pneumatic cylinder such as illustrated schematically 80 in FIG. 9, is operated to adjust the vertical position as necessary. The first portion 12 may be lowered into position by a release mechanism (not shown) which releases the locking levers 23 allowing an operator to manually lower the first portion 12 to a position substantially horizontal coming to rest on and being supported by a "T" brace 91, as illustrated in FIG. 5. The release mechanism may comprise any suitable conventional structure.

While the means for automatically pivoting the cart frame about a substantially horizontal axis, and means for moving the cart frame vertically, may be the structures described with respect to FIGS. 3 through 5, 7, and 9, any other suitable conventional components for pivoting a platform, and/or for vertically moving a platform, may be provided.

A common control box 85 (see FIGS. 3, 5, and 9) is provided for controlling the various motors and power sources. Various buttons—collectively schematically illustrated at 86 in the drawings—may be operated to control the motors 38, 72, 75 and/or the pneumatic cylinders 80 using any suitable control components and techniques, assuming that there will be some quick connect and disconnect connection between the motor 38 and the control box 55, which may be any suitable quick electrical connect or disconnect (or the motor 38 may be operated separately).

The transport assembly also preferably comprises a stacking table 87 (see FIG. 5), which may be part of another piece of equipment (e.g. a Moore 8700 unit), which table 87 has a substantially horizontal surface 88, the means 70, 71, 75, etc. for vertically moving the cart assembly 10 being operable to align the in-line first and second conveyors 30, 31, with the surface 88, as seen in FIG. 5. The stacking table 87 may be associated with a wide variety of different types of standard business forms handling equipment, including a continuous spiral type folder (shown). Preferably a separate 120 volt AC power source is provided to supply power to the motors 72 and 75, and—with appropriate step down—to the motor 38 (e.g. a 12 volt motor). A conventional voltage controller for that purpose is not illustrated in the drawings.

Also suitable electronic timers, or retro-reflective sensors, or mechanical switches, may be provided to determine when the cart assembly 10 is nearly full of forms, as the forms 90 (see FIG. 5) travel in the direction 36, 37 from the stacking table 87 onto the cart assembly 10. The timer circuits and retro-reflective sensors are known per se in the art.

Once a sufficient stack of forms has been compacted by the conveyors 30, 31, the movement of forms is stopped. Then a backstop 52 is placed on the second portion 13 against which the forms 90 are pushed by the first and second conveyers 30, 31 by activating a conventional high speed conveyor unload switch (not shown, but an actuator therefor seen at 86 in FIGS. 3, 5, and 9) on the common control box 85. The unload switch is activated to quickly remove forms from the first section 12 onto the second section 13, so that section 12 may be raised into the substantially L-shaped configuration illustrated in FIG. 6 to hold the forms in place. Then the cart assembly 10 is removed from the docking station 55 by an action essentially opposite to that described above with respect to docking, including through the position illustrated in FIG. 4, and then the handle 50 of the cart assembly 10 is grasped and the cart is moved out of the docking station 55 from the position illustrated in FIG. 3 to that illustrated in FIG. 1. FIG. 1 shows a typical stack of paper business forms 90 supported by the cart assembly 10 with the portion 13 generally vertical (but tilted slightly backwardly, e.g. 10 to 20°) and the portion 12 substantially horizontal (but also tilted approximately the same amount as the portion 13 so that a substantially 90° angle is maintained therebetween in the substantially L-shaped configuration thereof illustrated in FIGS. 1 through 4 and 6).

The invention also relates to a method of stacking business forms by (a) moving the cart assembly 10 with the portions 12, 13 in a substantially L-shaped configuration into operative association with the docking station 55; (b) lifting and rotating the cart assembly 10 in the docking station 55 so that the second portion 13 thereof is substantially horizontal; (c) pivoting the first portion 12 of the cart assembly 10 with respect to the second portion 13 so that the first portion 12 is also substantially horizontal and substantially in-line with the second portion 13 (see FIG. 5) and (d) operating the conveyors 30, 31 (with the motor 38, and with control panel 85 or by automatic activation in response to the action in step (c)) so that business forms 90 are moved (e.g. from stacking table 87) onto the first portion 12 and then onto the second portion 13.

Step (d) is typically practiced so as to move the business forms with the first conveyor 30 at a speed of at least 50% greater than the second conveyor 31, e.g. at a speed of about three-fifteen (e.g. about ten) times as great. There may also be the further steps of automatically (using any conventional sensors and indicators) indicating when the cart assembly 10 is substantially full of forms 90. There is preferably the further step of placing a backstop 52 on the second portion 13 against which the forms 90 are pushed by the first and second conveyors 30, 31 by activating a high speed conveyor unload switch on the common control box 85. The unload switch is activated, as described above, by pushing a button 86 to quickly remove forms from the first section 12 onto the second section 13, so that section 12 may be raised into the substantially L-shaped configuration (see FIG. 6), and moving the cart assembly 10 out of contact with the docking station 55. After the cart assembly 10 is moved out of contact with the docking station 55 there may be the further step of manually rolling the cart assembly 10, with forms 90 thereon (see FIG. 1) away from the docking station 55.

It will thus be seen that according to the present invention a simple yet effective cart assembly, material transport assembly using the cart assembly and a docking station, and a method for stacking business forms, are provided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims

What is claimed is:

1. A cart assembly comprising:

a frame having a first portion and a second portion pivotally connected to said first portion, and wherein said second frame portion has first and second ends, a handle mounted adjacent said first end of said second frame portion;

said second frame portion pivotally connected to said first frame portion adjacent said second end of said second portion;

a first conveyor mounted to said first portion, and a second conveyor mounted to said second portion, said first and second conveyors comprising interleaved conveyor belts;

at least one power source which powers said conveyors; and rolling supports attached to said frame which allow rolling movement of said frame.

2. An assembly as recited in claim 1 wherein said rolling supports comprise a first set of rolling supports connected to said first portion, and a second set of rolling supports connected to said second portion.

3. An assembly as recited in claim 1 further comprising a pair of shaft stubs extending outwardly from said second frame portion substantially in-line with each other.

4. A cart assembly comprising:

a frame having a first portion and a second portion pivotally connected to said first portion;

a first conveyor mounted to said first portion, and a second conveyor mounted to said second portion, said first and second conveyors comprising interleaved conveyor belts;

at least one power source which powers said conveyors; and rolling supports attached to said frame which allow rolling movement of said frame.

5. An assembly as recited in claim 4 wherein said first and second conveyors are driven so that said second conveyor moves at least fifty percent slower than said first conveyor.

6. An assembly as recited in claim 4 wherein said second frame portion has first and second ends, and further comprising a handle mounted adjacent said first end thereof, and wherein said second portion is pivotally connected to said first portion adjacent said second end of said second portion.

7. A cart assembly comprising:
a frame having a first portion and a second portion pivotally connected to said first portion;
a first conveyor mounted to said first portion, and a second conveyor mounted to said second portion;
at least one power source which powers said conveyors; and
rolling supports attached to said frame which allow rolling movement of said frame, comprising a first set of rolling supports connected to said first portion, and a second set of rolling supports connected to said second portion.

8. An assembly as recited in claim 7 wherein said first and second portions are pivotally connected so that they are movable from a first position in which said first and second portions are substantially perpendicular to each other, having a substantially L-shaped configuration, to a second position in which said first and second portion conveyors are substantially in-line with each other.

9. A material transport assembly, comprising:
a cart assembly having: a frame having a first portion and a second portion pivotally connected to said first portion, said first and second portions being movable from a first position in which said first and second portions are substantially perpendicular to each other, having a substantially L-shaped configuration, to a second position in which said first and second portion conveyors are substantially in-line with each other; a first conveyor mounted to said first portion, and a second conveyor mounted to said second portion; and rolling supports attached to said frame which allow rolling movement of said frame; and
a docking station dimensioned to receive said cart assembly therein and for moving said cart assembly from a position in which said second portion is generally upright to a position in which said cart assembly second portion is substantially horizontal.

10. An assembly as recited in claim 9 wherein said docking station comprises means for automatically pivoting said cart frame about a substantially horizontal axis, and means for moving said cart frame vertically.

11. An assembly as recited in claim 10 further comprising a stacking table having a substantially horizontal surface, said means for moving said cart frame vertically moving said cart frame so that said stacking table horizontal surface is substantially horizontally aligned with said in-line first and second conveyors.

12. An assembly as recited in claim 9 further comprising at least one power source which powers said conveyors, mounted on said cart frame.

13. An assembly as recited in claim 9 further comprising at least one pair of shaft stubs extending outwardly from said cart second frame portion substantially in-line with each other, and engaged by said docking station for effecting automatic pivoting of said cart frame about a horizontal axis.

14. A method for stacking business forms, using a cart assembly having first and second portions pivotally movable with respect to each other from a substantially L-shaped configuration to a substantially in-line configuration with each portion having a conveyor associated therewith, and a docking station, comprising the steps of:
(a) moving the cart assembly with the first and second portions in the substantially L-shaped configuration into operative association with the docking station;
(b) lifting and rotating the cart assembly in the docking station so that the second portion thereof is substantially horizontal;
(c) pivoting the first portion of the cart assembly with respect to the second portion so that the first portion is in the substantially in-line configuration with respect to the second portion; and
(d) operating the conveyors so that business forms are moved onto first portion, and then onto the second portion from the first portion.

15. A method as recited in claim 14 wherein step (d) is practiced so as to move the business forms with the first conveyor at a speed of at least fifty percent greater than the second conveyor.

16. A method as recited in claim 14 wherein step (d) is practiced so as to move the business forms with the first conveyor at a speed of about ten times greater than the second conveyor.

17. A method as recited in claim 14 comprising the further step of (e) automatically indicating when the frame is substantially full of forms and then stopping all motion of conveyors.

18. A method as recited in claim 17 comprising the further steps of (f) moving the forms off the first portion and stopping operation of the conveyors, (g) pivoting the first portion back to the substantially L-shaped configuration, and (h) lowering and rotating the cart assembly in the docking station so that the second portion thereof is substantially vertical; and (i) manually rolling the cart assembly with forms thereon away from the docking station.

19. A method as recited in claim 14 comprising the further step of placing a backstop on the second portion against which the forms are pushed.

20. A cart assembly comprising:
a frame having a first portion and a second portion pivotally connected to said first portion;
a first conveyor mounted to said first portion, and a second conveyor mounted to said second portion;
at least one power source which powers said conveyors;
said first and second frame portions pivotally connected so that they are movable from a first position in which said first and second portions are substantially perpendicular to each other, having a substantially L-shaped configuration, to a second position in which said first and second portion conveyors are substantially in-line with each other;
rolling supports attached to said frame which allow rolling movement of said frame; and
first and second levers each pivotally connected at a first end thereof to said first portion; and at a second end thereof to said second portion.

21. A cart assembly as recited in claim 20 wherein said first ends of said first and second levers are also slidably connected to said first frame portion.

22. A cart assembly comprising:
a frame having a first portion and a second portion pivotally connected to said first portion;
a pair of shaft stubs extending outwardly from said second frame portion substantially in-line with each other;
a first conveyor mounted to said first portion, and a second conveyor mounted to said second portion;
at least one power source which powers said conveyors; and
rolling supports attached to said frame which allow rolling movement of said frame.

23. A cart assembly comprising:
a frame having a first portion and a second portion pivotally connected to said first portion, and wherein said second frame portion has first and second ends, a handle mounted adjacent said first end of said second frame portion;

said second frame portion pivotally connected to said first frame portion adjacent said second end of said second portion;

a first conveyor mounted to said first portion, and a second conveyor mounted to said second portion;

at least one power source which powers said conveyors; and rolling supports attached to said frame which allow rolling movement of said frame, said rolling supports comprising a first set of rolling supports connected to said first portion, and a second set of rolling supports connected to said second portion.

24. A cart assembly comprising:

a frame having a first portion and a second portion pivotally connected to said first portion, and wherein said second frame portion has first and second ends, a handle mounted adjacent said first end of said second frame portion;

said second frame portion pivotally connected to said first frame portion adjacent said second end of said second portion;

a first conveyor mounted to said first portion, and a second conveyor mounted to said second portion;

at least one power source which powers said conveyors;

rolling supports attached to said frame which allow rolling movement of said frame; and a pair of shaft stubs extending outwardly from said second frame portion substantially in-line with each other.

* * * * *